United States Patent
Shin et al.

(10) Patent No.: US 12,500,272 B2
(45) Date of Patent: Dec. 16, 2025

(54) NON-AQUEOUS SOLVENT ELECTROLYTE FORMULATIONS FOR ENERGY STORAGE DEVICES

(71) Applicant: Tesla, Inc., Austin, TX (US)

(72) Inventors: Joon Ho Shin, San Diego, CA (US); Hieu Minh Duong, Rosemead, CA (US); Wilma Wong, San Diego, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/191,823

(22) Filed: Nov. 15, 2018

(65) Prior Publication Data
US 2019/0157722 A1  May 23, 2019

Related U.S. Application Data

(60) Provisional application No. 62/588,174, filed on Nov. 17, 2017.

(51) Int. Cl.
H01M 4/38 (2006.01)
H01G 11/60 (2013.01)
(Continued)

(52) U.S. Cl.
CPC ........ *H01M 10/0569* (2013.01); *H01G 11/60* (2013.01); *H01G 11/62* (2013.01); *H01M 4/505* (2013.01); *H01M 4/525* (2013.01); *H01M 4/583* (2013.01); *H01M 10/0525* (2013.01); *H01G 11/06* (2013.01); *H01M 4/38* (2013.01); *H01M 4/587* (2013.01); *H01M 2300/0037* (2013.01);
(Continued)

(58) Field of Classification Search
CPC .. H01M 10/0569; H01M 4/505; H01M 4/525; H01M 4/583; H01M 10/0525; H01M 2300/0037; H01M 4/38; H01M 4/587; H01M 2300/0042; H01M 2300/004; H01M 10/0568; H01G 11/62; H01G 11/60; H01G 11/06; Y02E 60/10; Y02T 10/70
USPC ........................................... 429/188
See application file for complete search history.

(56) References Cited

U.S. PATENT DOCUMENTS 5,169,731 A * 12/1992 Yoshimura .......... H01M 8/2428
427/115
7,147,674 B1 * 12/2006 Zhong .................... H01G 11/32
29/25.03
(Continued)

FOREIGN PATENT DOCUMENTS

CN  1976111  6/2007
CN  101061602  10/2007
(Continued)

OTHER PUBLICATIONS

Wang et al., Electrochemical performance of modified artificial graphite as anode material for lithium ion batteries, Mar. 2012, Ionics, 19, 221-226 (Year: 2012).*
(Continued)

*Primary Examiner* — Christian Roldan
(74) *Attorney, Agent, or Firm* — Knobbe Martens Olson & Bear LLP

(57) ABSTRACT

Provided herein are improved electrolyte formulations. The improved performance may be realized as improved discharge rate cycling, improved capacity, improved Coulombic efficiency, or improved capacity upon cycling.

25 Claims, 10 Drawing Sheets

(51) Int. Cl.
*H01G 11/62* (2013.01)
*H01M 4/505* (2010.01)
*H01M 4/525* (2010.01)
*H01M 4/583* (2010.01)
*H01M 10/0525* (2010.01)
*H01M 10/0569* (2010.01)
*H01G 11/06* (2013.01)
*H01M 4/587* (2010.01)

(52) U.S. Cl.
CPC ............... *H01M 2300/004* (2013.01); *H01M 2300/0042* (2013.01)

(56) References Cited

U.S. PATENT DOCUMENTS

| | | | | |
|---|---|---|---|---|
| 2001/0016289 | A1* | 8/2001 | Oura | H01M 50/417 429/223 |
| 2003/0013017 | A1* | 1/2003 | Nagayama | C01G 51/00 429/231 |
| 2003/0054225 | A1* | 3/2003 | Kaji | H01M 4/96 429/534 |
| 2003/0215716 | A1* | 11/2003 | Suzuki | H01M 4/0404 429/234 |
| 2004/0053134 | A1* | 3/2004 | Ozaki | H01M 4/485 429/223 |
| 2005/0053838 | A1* | 3/2005 | Ogasawara | H01M 10/0569 429/337 |
| 2005/0064289 | A1* | 3/2005 | Suzuki | H01M 4/139 252/182.1 |
| 2005/0208384 | A1* | 9/2005 | Yanai | H01M 4/525 429/231.1 |
| 2007/0178380 | A1* | 8/2007 | Iwanaga | H01M 10/0567 429/231.4 |
| 2007/0248884 | A1* | 10/2007 | Tsuchiya | H01M 4/133 429/231.4 |
| 2009/0029248 | A1 | 1/2009 | Deguchi et al. | |
| 2009/0169999 | A1* | 7/2009 | Deguchi | H01M 10/058 429/246 |
| 2010/0285368 | A1* | 11/2010 | Yamamoto | H01M 10/0565 429/231.95 |
| 2011/0053045 | A1* | 3/2011 | Kim | H01M 8/1097 427/446 |
| 2011/0250506 | A1 | 10/2011 | Koshina | |
| 2011/0287296 | A1* | 11/2011 | Sabi | H01M 10/0562 429/127 |
| 2014/0238576 | A1* | 8/2014 | Zhong | H01G 11/28 156/62.2 |
| 2014/0342240 | A1 | 11/2014 | Harrup et al. | |
| 2015/0010784 | A1* | 1/2015 | Takahata | H01M 4/366 429/7 |
| 2015/0079477 | A1* | 3/2015 | Spahr | C23C 16/26 427/248.1 |
| 2015/0303481 | A1* | 10/2015 | Duong | H01G 9/15 429/217 |
| 2015/0311563 | A1* | 10/2015 | Abe | H01M 4/525 429/188 |
| 2016/0329602 | A1* | 11/2016 | Kojima | H01M 10/0562 |
| 2017/0237069 | A1* | 8/2017 | Takamori | C01G 53/50 429/223 |
| 2017/0288181 | A1 | 10/2017 | Hwang et al. | |

FOREIGN PATENT DOCUMENTS

| | | |
|---|---|---|
| CN | 102035022 | 4/2011 |
| CN | 103072974 | * 5/2013 |
| CN | 104448324 | 3/2015 |
| CN | 104937749 | 9/2015 |
| EP | 2 840 639 | 2/2015 |
| JP | 09-115546 | 5/1997 |
| JP | 2002-359003 | 12/2002 |
| JP | 2003-086179 | 3/2003 |
| JP | 2003-086242 | 3/2003 |
| JP | 2003-217653 | 7/2003 |
| JP | 2004-006285 | 1/2004 |
| JP | 2005-332707 | 12/2005 |
| JP | 2007-087963 | 4/2007 |
| JP | 2011-216241 | 10/2011 |
| JP | 2015-015165 | 1/2015 |
| JP | 2017-157337 | 9/2017 |
| JP | 2017-157557 | 9/2017 |
| KR | 10-2013-0136934 | 12/2013 |
| WO | WO 10/082261 | 7/2010 |

OTHER PUBLICATIONS

Xu, Kang; Nonaqueous Liquid Electrolytes for Lithium-Based Rechargeable batteries; ACS Publications; Chem. Rev.; Sep. 2004, 104, 10 4303-4418 (Year: 2004).*

International Search Report and Written Opinion dated Jun. 14, 2019 in PCT/US2018/061641.

Wood et al., Aug. 29, 2017, Technical and economic analysis of solvent-based lithium-ion electrode drying with water and NMP, Drying Technology, 36(2):1-11.

Nishida, Tatsuya, Apr. 18, 2010, Development of Surface Modified Carbon Anode Material for High-Power Lithium Ion Battery, https://www.jst.go.jp/sicp/ws2010_tu/abstract/5-Nishida.pdf.

Swierupski, Robert B., Mar. 19, 2010, RE: The tariff classification of two surface modified graphite powders from Japan, https://www.customsmobile.com/rulings/docview?doc_id=NY%20N094256&highlight=3801.10%2A.

* cited by examiner

NON-AQUEOUS SOLVENT ELECTROLYTE FORMULATIONS FOR ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit of U.S. Provisional Patent Application No. 62/588,174, filed Nov. 17, 2017, entitled "NON-AQUEOUS SOLVENT ELECTROLYTE AND ITS FORMULATION FOR DRY BATTERY ELECTRODES."

BACKGROUND

Field

The present invention relates generally to energy storage devices, and specifically to improved electrolyte formulations for use in energy storage devices.

Description of the Related Art

Electrical energy storage cells are widely used to provide power to electronic, electromechanical, electrochemical, and other useful devices. Such cells include primary chemical cells, secondary (rechargeable) cells, fuel cells, and various species of capacitors, including ultracapacitors. Increasing the operating voltage and temperature of energy storage devices, including capacitors, would be desirable for enhancing energy storage, increasing power capability, and broadening real-world use cases.

Lithium ion batteries have been relied on as a power source in numerous commercial and industrial uses, for example, in consumer devices, productivity devices, and in battery powered vehicles. However, demands placed on energy storage devices are continuously—and rapidly—growing. For example, the automotive industry is developing vehicles that rely on compact and efficient energy storage, such as plug-in hybrid vehicles and pure electric vehicles. Lithium ion batteries are well suited to meet future demands however improvements in energy density are needed to provide longer life batteries that can travel further on a single charge.

Electrolyte is one of the key components in conventional lithium ion batteries that determines electrochemical performance as well as safety of those batteries. The compatibility between electrode and electrolyte in part governs battery cell performance. In addition, the electrolyte system plays an important role in achieving high performance in battery cell as the electrodes are made thicker and/or heavier.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, an energy storage device can comprise an improved electrolyte formulation as provided herein. In some implementations, the energy storage device is a lithium ion battery.

One embodiment is an energy storage device that contains: a cathode comprising a cathode active material; an anode comprising an anode active material; a separator between the cathode and the anode; and an electrolyte comprising a lithium salt and a non-aqueous electrolyte solvent formulation comprising ethylene carbonate (EC) and an additional solvent selected from at least one of ethyl methyl carbonate (EMC), dimethylcarbonate (DMC) and propylene carbonate (PC), wherein the volume ratio of EC to the additional solvent is about 1:2 to about 1:4.

Another embodiment is a method of forming an energy storage device. The method may include: providing a housing, placing into the housing a cathode, an anode and a separator between the cathode and the anode, wherein at least one of the cathode and anode is free of solvent residue; and placing into the housing an electrolyte comprising a lithium salt and a non-aqueous electrolyte solvent formulation comprising ethylene carbonate (EC) and an additional solvent selected from at least one of ethyl methyl carbonate (EMC), dimethylcarbonate (DMC) and propylene carbonate (PC), wherein the volume ratio of EC to the additional solvent is about 1:2 to about 1:4.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

Definitions

Figure 1:
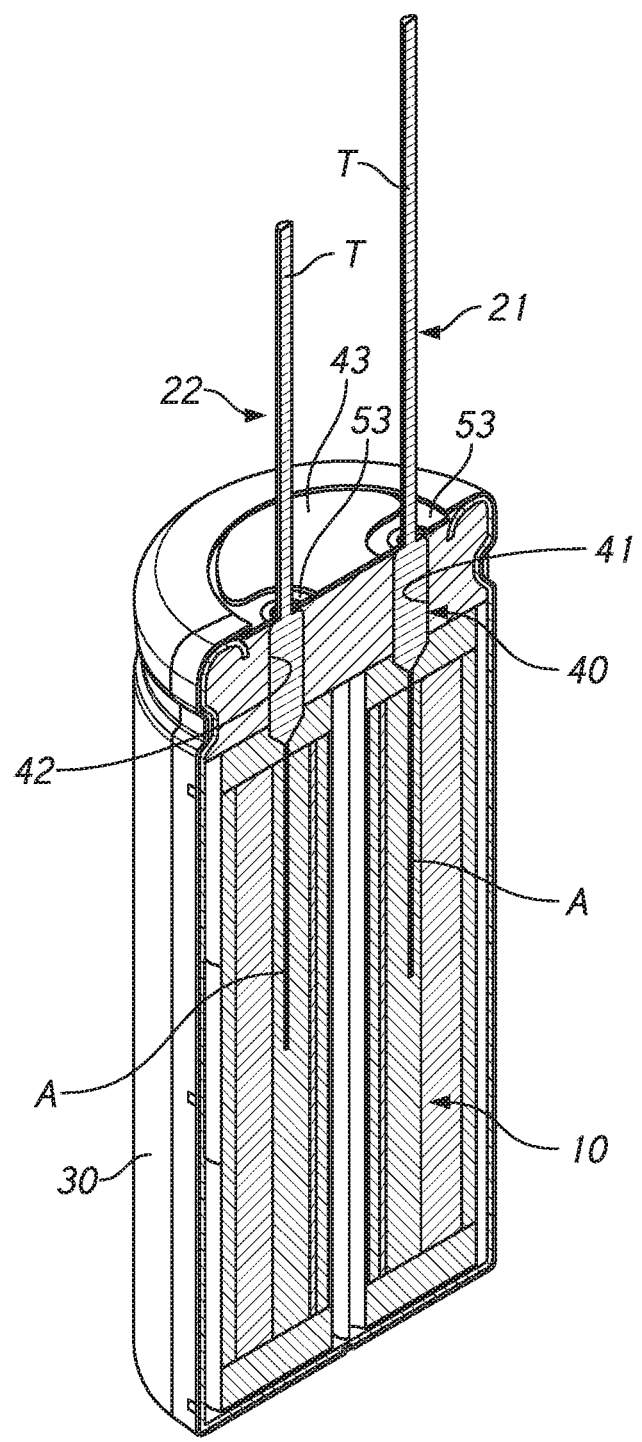
FIG. 1 depicts a longitudinal sectional view showing an example embodiment of an energy storage device with an improved electrolyte formulation.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film or active layer is an electrode film or layer that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements.

As provided herein, a "solvent-free" electrode film is an electrode film that contains no detectable processing solvents, processing solvent residues, or processing solvent impurities. Processing solvents or traditional solvents include organic solvents. A dry electrode film, such as a cathode electrode film or an anode electrode film, may be solvent-free.

A "wet" electrode or "wet process" electrode is an electrode prepared by at least one step involving a slurry of active material(s), binder(s), and processing solvents, processing solvent residues, and/or processing solvent impurities. A wet electrode may optionally include additive(s).

DESCRIPTION

Various embodiments of the invention relate to electrolyte formulations for energy storage devices having improved performance. The energy storage devices may be lithium ion based batteries in one embodiment.

One embodiment is an energy storage device having an improved non-aqueous electrolyte solvent blend. The improved electrolyte may improve the physical and chemical characteristics of an electrolyte such as viscosity, wettability and conductivity. The performance effect of electrolytes may be attributed in part to physical properties such as viscosity and wettability and chemical or electrochemical properties such as reactivity of solvent on an electrode surface, for example, a graphite surface. The shape of the particles of active material may also play a role. For example, of graphite materials, particles may be spherical-shaped graphite (also known as "potato-shaped" graphite) or flake-shaped graphite.

In an embodiment, the electrolyte compositions accentuate the electrochemical performance of electrodes, and in particular, dry processed battery electrodes. The disclosure provides electrolyte compositions for use with relatively thick or high-loading battery electrodes. Discharge rate performance for an improved electrolyte formulation provided herein may be compared to typical lithium-ion battery electrolytes.

In one embodiment, the improved electrolyte formulation can include a lithium salt, and an electrolyte solvent, such as a mixture of non-aqueous or organic solvents, and optionally one or more additives. For example, the improved electrolyte may include one or more carbonates such as, for example, ethylene carbonate (EC), propylene carbonate (PC), vinyl ethylene carbonate (VEC), vinylene carbonate (VC), fluoroethylene carbonate (FEC), and combinations thereof. The electrolyte may also include on or more acyclic carbonates such as, for example, dimethyl carbonate (DMC), diethyl carbonate (DEC), ethyl methyl carbonate (EMC), and combinations thereof.

Generally, the lithium salt can include an anion that is redox stable. In some embodiments, the anion can be monovalent. In some embodiments, a lithium salt can be selected from hexafluorophosphate (LiPF$_6$), lithium tetrafluoroborate (LiBF$_4$), lithium perchlorate (LiClO$_4$), lithium bis(trifluoromethansulfonyl)imide (LiN(SO$_2$CF$_3$)$_2$), lithium trifluoromethansulfonate (LiSO$_3$CF$_3$), and combinations thereof. In some embodiments, the electrolyte can include an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or any range of values therebetween.

In some embodiments, an energy storage device electrolyte as provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate described herein. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise LiPF$_6$, and one or more carbonates.

Electrolyte formulations provided herein can further be optimized by adjusting the individual solvent ratio in a given formulation. For example, the energy storage device may include a non-aqueous electrolyte solvent formulation comprising ethylene carbonate (EC) and at least one additional solvent. In one embodiment, the additional solvent may include ethyl methyl carbonate (EMC), dimethylcarbonate (DMC) of propylene carbonate (PC). In some embodiments, wherein the volume ratio of the EC to the additional solvent is about 1:2 to about 1:4, although other ranges are contemplated.

Electrolyte formulations provided herein can further include one or more additives. An additive may be, for example, a lithium salt or a liquid additive. Examples of lithium salts are $LiClO_4$, $LiBF_4$, $CF_3SO_2NLiSO_2CF_3$, $C_4F_{10}LiNO_4S_2$, and combinations thereof, and at various salt concentration ratios. Additives may be selected for improved SEI formation and increased wetting rate, for example vinylene carbonate, vinyl ethylene carbonate, fluoroethylene carbonate and cyclohexane etc., can also be included. In some embodiments, the electrolyte formulation comprises a lithium salt additives in about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 3%, 4%, or 5%, or any range of values therebetween.

In some embodiments, the electrolyte solvent may comprise EC/EMC/DMC/PC solvents in a volume ratio of about 1:2:0.1:0.02. In some embodiments, the electrolyte solvent comprises EC/DMC in a volume ratio of about 1:3. In some embodiments, the electrolyte solvent comprises EC/EMC in a volume ratio of about 1:3. In some embodiments, the electrolyte solvent comprises EC/EMC in a volume ratio of about 1:2.4. In some embodiments, the electrolyte solvent comprises EC/EMC/DMC in a volume ratio of about 1:0.5:3. In some embodiments, the electrolyte solvent comprises EC/EMC/DMC in a volume ratio of about 1:1:1. In some embodiments, the electrolyte solvent comprises EC/EMC in a volume ratio of about 1:4. In some embodiments, the electrolyte solvent comprises EC/DMC in a volume ratio of about 1:4. In further embodiments, the lithium salt is present in the electrolyte in a concentration of about 0.1 M to about 2 M. For example the lithium salt may be present in the electrolyte in a concentration of about 1 to 1.3 M. In further embodiments, the lithium salt is $LiPF_6$.

In some embodiments, an energy storage device including an electrolyte formulation as provided herein may demonstrate a higher discharge rate capability in comparison to energy storage devices that do not use the improved electrolyte formulations. Such higher discharge rate capability is desirable in high energy, high power applications such as electric vehicle propulsion. In conventional lithium ion batteries, discharge rates less than about C/5 are typically manageable by higher energy electrode designs, where C/5 is a discharge current relative to cell capacity such that the cell is drained in 5 hours. However, as the electrodes become thicker (as correlated with higher cell energy), the electrolyte formulation becomes increasingly important to address discharge performance at higher C-rates (1 C and above). In some embodiments, the disclosed electrolyte formulations exhibit a discharge performance benefit, providing higher energy retention at higher discharge current. In some embodiments, an electrolyte formulation provided herein demonstrates higher discharge rate capability.

An energy storage device including an electrolyte formulation described herein may be characterized by improved capacity retention over the life of the device. Improved capacity retention may provide a device with improved power density over the life of the device. In further embodiments, an energy storage device including an electrolyte provided herein may exhibit improved energy delivery at high C-rates. For example, improved energy delivery may be realized at C-rates greater than 1. Some embodiments provide an energy storage device exhibiting improved Coulombic efficiency relative to an energy storage device including a typical electrolyte. Further improvements that may be realized in various embodiments include improved cycling performance, including improved storage stability during cycling, and reduced capacity fade.

The electrolyte solvent and/or the electrolyte additives may facilitate formation of a solid electrolyte interphase (SEI) layer on a surface of an electrode. It is believed that the solid electrolyte interphase may be formed in part due to decomposition of one or more components of the electrolyte. For example, single-step or multi-stop decomposition reactions which transfer electron(s) to one or more solid electrolyte interphase-forming components of the electrolyte may result in formation of the solid electrolyte interphase at the interface between the anode and electrolyte. An electrode having a solid electrolyte interphase layer may exhibit lower operable anode potential, and/or higher operable potential for the energy storage device.

It will be understood that an electrolyte formulation provided herein, can be used in various embodiments with any of a number of energy storage devices and systems, such as one or more batteries, capacitors, capacitor-battery hybrids, fuel cells, or other energy storage systems or devices and combinations thereof. In some embodiments, an electrolyte additive or electrolyte including an additive described herein may be implemented in lithium ion batteries.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

FIG. 1 shows a longitudinal sectional view showing an example embodiment of an energy storage device. The device has a wound electrode unit 10, which includes the first current collection sheet and the second current collection sheet, is impregnated with an improved electrolyte as provided herein, and is placed in a case 30. The upper end of the case 30, which faces a rubber cap 40, may be beaded and curled, whereby coupling therebetween is completed. A first terminal 21 extends through a upper surface 53 to an inner portion 41, and is connected to the wound electrode unit 10, which is used as the positive electrode current collector. The first terminal 21 functions as a positive electrode terminal. A second terminal 22, extends through the upper surface 53 to a second inner portion 42 and it then connected to a negative electrode current collector, and functions as a negative electrode terminal. A rubber stopper 40 is disposed inside the upper portion of the case 30 to prevent electrolyte leakage from the interior of the case 30 to the exterior of the device.

Figure 2:
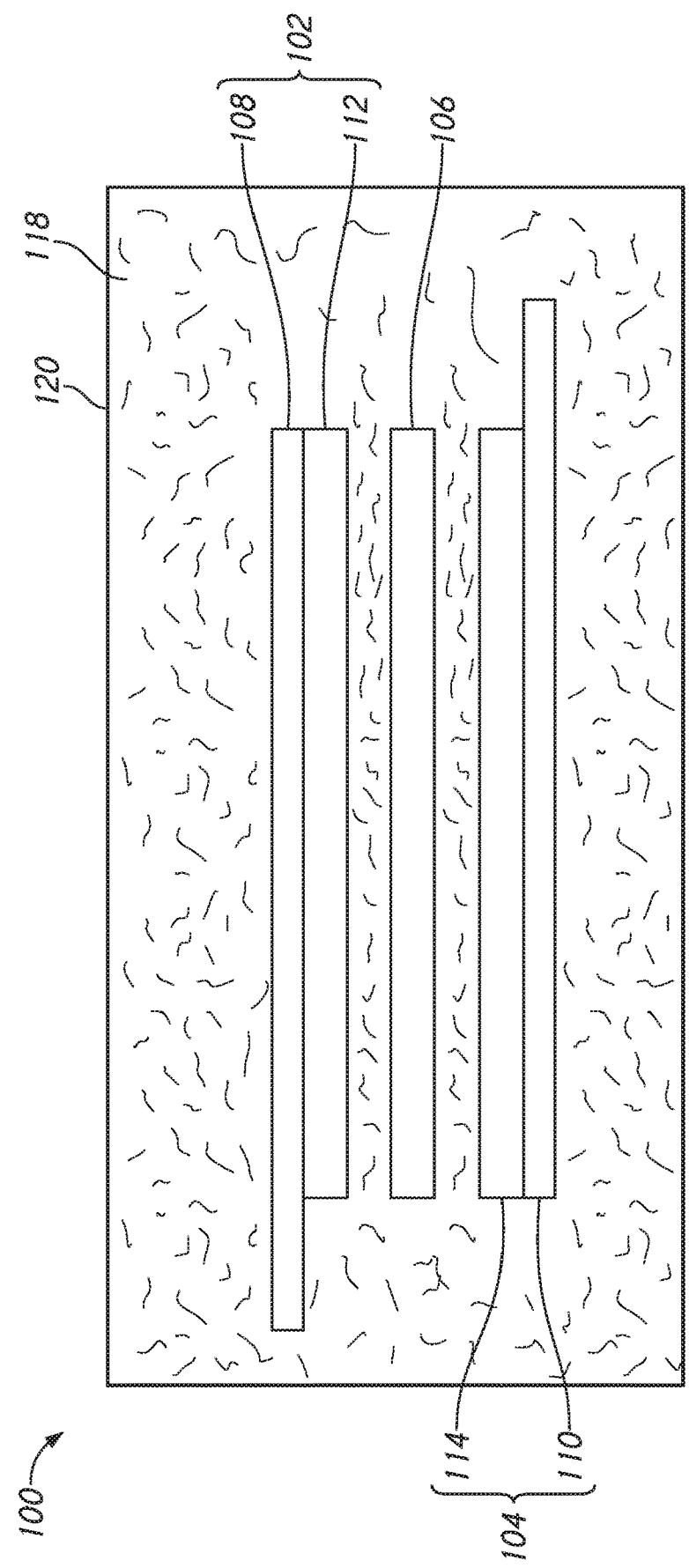
FIG. 2 depicts an embodiment of an energy storage device with an improved electrolyte formulation.

FIG. 2 shows a side cross-sectional schematic view of an example of an energy storage device 100 with an improved electrolyte formulation provided herein. The energy storage device 100 may be classified as, for example, a capacitor, a battery, a capacitor-battery hybrid, or a fuel cell. In preferable embodiments, device 100 is a lithium ion battery.

The device has a first electrode 102, a second electrode 104, and a separator 106 positioned between the first electrode 102 and second electrode 104. The first electrode 102 and the second electrode 104 are adjacent to respective opposing surfaces of the separator 106. The energy storage device 100 includes an improved electrolyte formulation 118 to facilitate ionic communication between the electrodes 102, 104 of the energy storage device 100. For example, the improved electrolyte formulation 118 may be in contact with the first electrode 102, the second electrode 104 and the separator 106. The improved electrolyte formulation 118, the first electrode 102, the second electrode 104, and the separator 106 are housed within an energy storage device housing 120.

One or more of the first electrode 102, the second electrode 104, and the separator 106, or constituent thereof, may comprise porous material. The pores within the porous material can provide containment for and/or increased surface area for contact with an improved electrolyte formulation 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise high density electrode films 112 and 114, respectively. High density electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, about 300 microns, about 400 microns, about 500 microns, about 750 microns, about 1000 microns, about 2000 microns, or any range of values therebetween. The electrode films generally comprise one or more active materials, for example, anode active materials or cathode active materials as provided herein. The electrode films 112 and/or 114 may be dry and/or self-supporting electrode films as provided herein, and having advantageous properties, such as thickness, energy density, specific energy density, areal energy, or areal capacity, as provided herein. The first electrode film 112 and/or the second electrode film 114 may also include one or more binders as provided herein. The electrode films 112 and/or 114 may be prepared by a process as described herein. The electrode films 112 and/or 114 may be wet or self-supporting dry electrodes as described herein.

As shown in FIG. 2, the first electrode 102 and the second electrode 104 include a first current collector 108 in contact with first high density electrode film 112, and a second current collector 110 in contact with the second high density electrode film 114, respectively. The first current collector 108 and the second current collector 110 facilitate electrical coupling between each corresponding electrode film and an external electrical circuit (not shown). The first current collector 108 and/or the second current collector 110 comprise one or more electrically conductive materials, and have can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

In some embodiments, energy storage device 100 can be a lithium ion battery. In some embodiments, the electrode film of a lithium ion battery electrode can comprise one or more active materials, and a fibrillized binder matrix as provided herein.

In some embodiments, the lithium ion battery is configured to operate at about 2.5 to 4.5 V, or 3.0 to 4.2 V. In further embodiments, the lithium ion battery is configured to have a minimum operating voltage of about 2.5 V to about 3 V, respectively. In still further embodiments, the lithium ion battery is configured to have a maximum operating voltage of about 4.1 V to about 4.4 V, respectively.

In some embodiments, an electrode film as provided herein includes at least one active material and at least one binder. The at least one active material can be any active material known in the art. The at least one active material may be a material suitable for use in the anode or cathode of a battery.

In some embodiments, an electrode film of a lithium ion energy storage device can comprise an anode active material. In some embodiments, anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.).

In some embodiments, an electrode film of a lithium ion energy storage device can comprise active cathode material. In some embodiments, cathode active materials can comprise, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can comprise, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)), an olivine (such as $LiFePO_4$), silicon, silicon oxide (SiOx), aluminum, tin, tin oxide (SnOx), manganese oxide (MnOx), molybdenum oxide ($MoO_2$), molybdenum disulfide ($MoS_2$), nickel oxide (NiOx), or copper oxide (CuOx). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), poly(ethylene oxide) (PEO), polyethylene (PE), polyacrylic acid (PAA), gelatin, other thermoplastics, or any combination thereof.

Anode active materials include common natural graphite, synthetic or artificial graphite, surface modified graphite, spherical-shaped graphite, flake-shaped graphite and blends or combinations of these types of graphite, metallic elements and its compound as well as metal-C composite for anode.

The type and shape of the anode active material and the electrolyte solvent formulation, as discussed previously herein, utilized in the energy storage device may affect the performance of the energy storage device. The electrochemical performance of the anode electrode utilizing a specific electrolyte formulation may be attributed to physical properties, such as viscosity and wettability, and chemical or electrochemical properties of the electrolyte formulation, such as reactivity of solvent on the anode active material surface. For example, the particle shape and particle size of a graphite powder affects the surface area of the powder that is available to electrolyte. Different amounts of surface area may impact the extent of irreversible electrochemical reactions of electrolyte components on the surface of the graphite particles. Without being bound to theory, solvent decomposition is believed to be the main irreversible reaction that occurs on graphite particles during the first lithiation process. Typical $Li/Li^+$ reduction potentials of solvents include: EC=1.36V; DMC=1.32V; DEC 1.32V; EMC<1.32V; and PC=1.0-1.6V.

In general, flake-shaped particles have larger surface areas relative to their volume than spherical-shaped particles. Furthermore, in some embodiments, the use of cyclic carbonates (e.g. EC) in the electrolyte formulation may result in an increased viscosity of the solvent mixture. In some embodiments, increased electrolyte viscosity results in a stable solid phase interphase (SEI) on graphite particles that are operated at relatively low voltages. In some embodiments, the use of linear carbonates (e.g. DMC) in the electrolyte formulation may result in a reduced viscosity of the solvent mixture. In some embodiments, reduced electrolyte viscosity results in improved ionic conductivity of electrolyte solution.

In some embodiments, EC-based and EMC-rich electrolyte formulations used with a spherical-shaped graphite anode active material show improved electrochemical performance. In some embodiments, EC-based and EMC-rich electrolyte formulations used with a natural graphite anode active material show improved electrochemical performance. In some embodiments, EC-based and EMC-rich electrolyte formulations used with a surface modified artificial graphite anode active material show improved electrochemical performance. In some embodiments, EC-based and EMC-rich electrolyte formulations used with a flake-shaped artificial graphite anode active material show improved electrochemical performance. In some embodiments, EC-based and DMC-rich electrolyte formulations used with a flake-shaped graphite anode active material show improved electrochemical performance. In some embodiments, EC-based and DMC-rich electrolyte formulations used with a flake-shaped artificial graphite anode active material show improved electrochemical performance.

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon.

In some embodiments, a cathode electrode film of a lithium ion battery or hybrid energy storage device can include about 70 weight % to about 98 weight % of the at least one active material, including about 70 weight % to about 92 weight %, or about 70 weight % to about 96 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

Some embodiments include an electrode film, such as of an anode and/or a cathode, having one or more active layers comprising a polymeric binder material. The binder can include polytetrafluoroethylene (PTFE), a polyolefin, polyalkylenes, polyethers, styrene-butadiene, co-polymers of polysiloxanes and polysiloxane, branched polyethers, polyvinylethers, co-polymers thereof, and/or admixtures thereof.

The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder comprises a fibrillizable polymer. In certain embodiments, the binder comprises, consists essentially, or consists of PTFE.

In some embodiments, the binder may comprise PTFE and optionally one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. An admixture of polymers may comprise interpenetrating networks of the aforementioned polymers or co-polymers.

The binder may include various suitable ratios of the polymeric components. For example, PTFE can be up to about 100 weight % of the binder, for example, from about 20 weight % to about 95 weight %, about 20 weight % to about 90 weight %, including about 20 weight % to about 80 weight %, about 30 weight % to about 70 weight %, about 30 weight % to about 50 weight %, or about 50 weight % to about 90 weight %. In further embodiments, the binders can comprise PTFE, CMC, and PVDF as binders. In certain embodiments, the electrode film can comprise 2 weight % PTFE, 1 weight % CMC, and 1 weight % PVDF. For example, the binder mixture can include a mass of PTFE which is 50% of the total binder content of the electrode film, and 2% of the total mass of the electrode film.

In some embodiments, the electrode film mixture may include binder particles having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 µm, about 2 µm, about 3 µm, about 4 µm, about 5 µm, about 10 µm, about 50 µm, about 100 µm, or any range of values therebetween.

As used herein, a dry fabrication process can refer to a process in which no or substantially no solvents are used in the formation of an electrode film. For example, components of the active layer or electrode film, including carbon materials and binders, may comprise dry particles. The dry particles for forming the active layer or electrode film may be combined to provide a dry particle active layer mixture. In some embodiments, the active layer or electrode film may be formed from the dry particle active layer mixture such that weight percentages of the components of the active layer or electrode film and weight percentages of the components of the dry particles active layer mixture are substantially the same. In some embodiments, the active layer or electrode film formed from the dry particle active layer mixture using the dry fabrication process may be free from, or substantially free from, any processing additives such as solvents and solvent residues resulting therefrom. In some embodiments, the resulting active layer or electrode films are self-supporting films formed using the dry process from the dry particle mixture. In some embodiments, the resulting active layer or electrode films are free-standing films formed using the dry process from the dry particle mixture. A process for forming an active layer or electrode film can include fibrillizing the fibrillizable binder component(s) such that the film comprises fibrillized binder. In further embodiments, a free-standing active layer or electrode film may be formed in the absence of a current collector. In still further embodiments, an active layer or electrode film may comprise a fibrillized polymer matrix such that the film is self-supporting. It is thought that a matrix, lattice, or web of fibrils can be formed to provide mechanical structure to the electrode film.

In some embodiments, an energy storage device electrode film, wherein the electrode film is dry and/or self-supporting film, may provide material loading, or active material loading (which may be expressed as mass per unit area of electrode film or current collector) of about 12 mg/cm$^2$, about 13 mg/cm$^2$, about 14 mg/cm$^2$, about 15 mg/cm$^2$, about 16 mg/cm$^2$, about 17 mg/cm$^2$, about 18 mg/cm$^2$, about 19 mg/cm$^2$, about 20 mg/cm$^2$, about 21 mg/cm$^2$, about 22 mg/cm$^2$, about 23 mg/cm$^2$, about 24 mg/cm$^2$, about 25 mg/cm$^2$, about 26 mg/cm$^2$, about 27 mg/cm$^2$, about 28 mg/cm$^2$, about 29 mg/cm$^2$, about 30 mg/cm$^2$, about 50 mg/cm$^2$, or about 60 mg/cm$^2$, or about 70 mg/cm$^2$, or about 80 mg/cm$^2$, or about 90 mg/cm$^2$, or about 100 mg/cm$^2$, or any range of values therebetween.

In some embodiments, an energy storage device electrode film, wherein the electrode film is dry and/or self-supporting film, may provide a specific capacity (which may be expressed as capacity per mass of active material) of about 100 mAh/g, about 125 mAh/g, about 150 mAh/g, about 160 mAh/g, about 170 mAh/g, about 175 mAh/g, about 176 mAh/g, about 177 mAh/g, about 179 mAh/g, about 180 mAh/g, about 185 mAh/g, about 190 mAh/g, about 196 mAh/g, about 200 mAh/g, about 250 mAh/g, about 300 mAh/g, about 350 mAh/g, about 354 mAh/g or about 400 mAh/g, or any range of values therebetween. In further embodiments, an energy storage device electrode film, wherein the electrode film is dry and/or self-supporting film, may provide specific capacity (which may be expressed as capacity per mass of electrode film or current collector) of at least about 100 mAh/g or at least about 150 mAh/g, or any range of values therebetween. In some embodiments, the specific capacity is charging capacity. In further embodiments, the specific capacity is discharging capacity. In some embodiments, the electrode may be an anode and/or a cathode. In some embodiment, the specific capacity may be a first charge and/or discharge capacity. In further embodiments, the specific capacity may be a charge and/or discharge capacity measured after the first charge and/or discharge.

In some embodiments, a self-supporting dry electrode film described herein may advantageously exhibit improved performance relative to a typical electrode film. The performance may be, for example, tensile strength, elasticity (extension), bendability, coulombic efficiency, capacity, or conductivity. In some embodiments, an energy storage device electrode film, wherein the electrode film is dry and/or self-supporting film, may provide a coulombic efficiency, for example, a $1^{st}$ cycle coulombic efficiency (which may be expressed as a percent of the discharge capacity divided by the charge capacity) of about, or at least about, 80%, 85%, 86%, 87%, about 88%, about 89%, about 90%, about 91%, about 92%, about 93%, about 94% or about 95%, or any range of values therebetween, for example such as 90.1%, 90.5% and 91.9%, or any range of values therebetween.

In some embodiments, an energy storage device electrode film or electrode, wherein the electrode film is or the electrode comprises a dry and/or self-supporting film, may provide a capacity retention percentage (which may be expressed by the charge or discharge capacity at a given rate divided by the charge or discharge capacity measured at C/10) of about or at least about 10%, about or at least about 20%, about or at least about 30%, about or at least about 40%, about or at least about 50%, about or at least about 60%, about or at least about 70%, about or at least about 80%, about or at least about 90%, about or at least about 98%, about or at least about 99%, about or at least about 99.9% or about or at least about 100%, or any range of values therebetween. In some embodiments, the charge or discharge rate of the capacity retention percentage is or is at least C/10, C/5, C/3 (0.33 C), C/2, 1 C, 1.5 C or 2 C, or any range of values therebetween. The charge or discharge rate of the capacity retention percentage may be measured at a set number of charge and discharge cycles after the $1^{st}$ charge or discharge cycle. In some embodiments, the charge or discharge rate of the capacity retention percentage is measured at 1, 5, 10, 50, 100, 200, 300, 400, 500, 600, 700 or 1000 cycles, or any range of values therebetween.

In some embodiments, a self-supporting dry electrode film described herein may advantageously exhibit improved performance relative to a typical electrode film. The performance may be, for example, Coulombic efficiency, capacity, or conductivity.

In specific examples below, energy storage devices including electrolyte formulations described herein were fabricated.

EXAMPLES

Example 1

The studies shown in Example 1 examined electrolyte formulations mainly consisting of EC, EMC, DMC, PC and $LiPF_6$ (see Table 1) and characterized the effect of electrode material, electrode formulation, dry electrode process on electrochemical performance in a half cell as well as a full cell configuration. The fraction of EMC or DMC in each EC-based electrolyte solution was found to determine in part the electrochemical performance of an anode electrode. For example, it was discovered that EMC-rich and EC-based electrolyte formulations solvents for spherical-shaped graphite compositions had improved capacity at high discharge rates. In addition, it was discovered that EC-based and DMC-rich electrolyte solvents, when used with -shaped graphite compositions would also exhibit improved capacity at high discharge C-rates.

The following six solvent formulations described below were developed and evaluated with dry processed battery electrodes made of different active materials and electrode processing condition to greater enhance the overall electrochemical performance. The improvement leverages the compatibility between the resulting electrolyte candidate and the designed dry battery electrode as well as prohibiting undesired reactions of electrolyte on dry electrode surface:

EC-based solvent mixture containing one or more solvents.

EC-based solvent mixture containing one or more solvents with higher than typical fraction of EMC.

EC-based solvent mixture containing one or more solvents with higher than typical fraction of DMC.

EC-based solvent mixture containing one or more solvents with higher than typical fraction of DEC.

EC-based solvent mixture containing one or more solvents with higher than typical fraction of PC.

EC-based solvent mixture containing one or more solvents with same fraction between solvents.

Commercially available non-aqueous solvents including EC, EMC, DEC, DMC, PC, EA and their blends were used in various combinations and without further purification. The formulated solvent volume ratios as described in detailed below with formulation examples is provided in Table 1.

TABLE 1

Electrolyte formulations in different solvent ratio examined in preliminary experiments

|  | EC | EMC | DMC | PC | Li salt |
| --- | --- | --- | --- | --- | --- |
| Formula 1 | 1 | 2 | 0.1 | 0.02 | LiPF6 |
| Formula 2 | 1 | 0 | 3 | 0 | LiPF6 |
| Formula 3 | 1 | 2.4 | 0 | 0 | LiPF6 |
| Formula 4 | 1 | 0.5 | 3 | 0 | LiPF6 |
| Formula 5 | 1 | 1 | 1 | 0 | LiPF6 |
| Formula 6 | 1 | 4 | 0 | 0 | LiPF6 |
| Formula 7 | 1 | 0 | 4 | 0 | LiPF6 |

The resulting electrolyte formulations were evaluated in single layer dry electrode half-cells and full-cells to assess the effect of solvent formulation on electrode performance. The electrochemical performance of the cells was measured by a constant current charge step followed by a constant voltage step and discharged at a constant current step at room temperature.

Thick dry electrodes were used to benchmark the electrolyte formulation candidates as they provided a higher sensitivity to the overall performance, an advantage that is limited by wet coating technology due to cracking, delamination and stiffness, etc. The preliminary experiments disclosed here used electrode loading of about 23 $mg/cm^2$ for the dry anode and about 45 $mg/cm^2$ for the dry cathode.

Figure 3A:
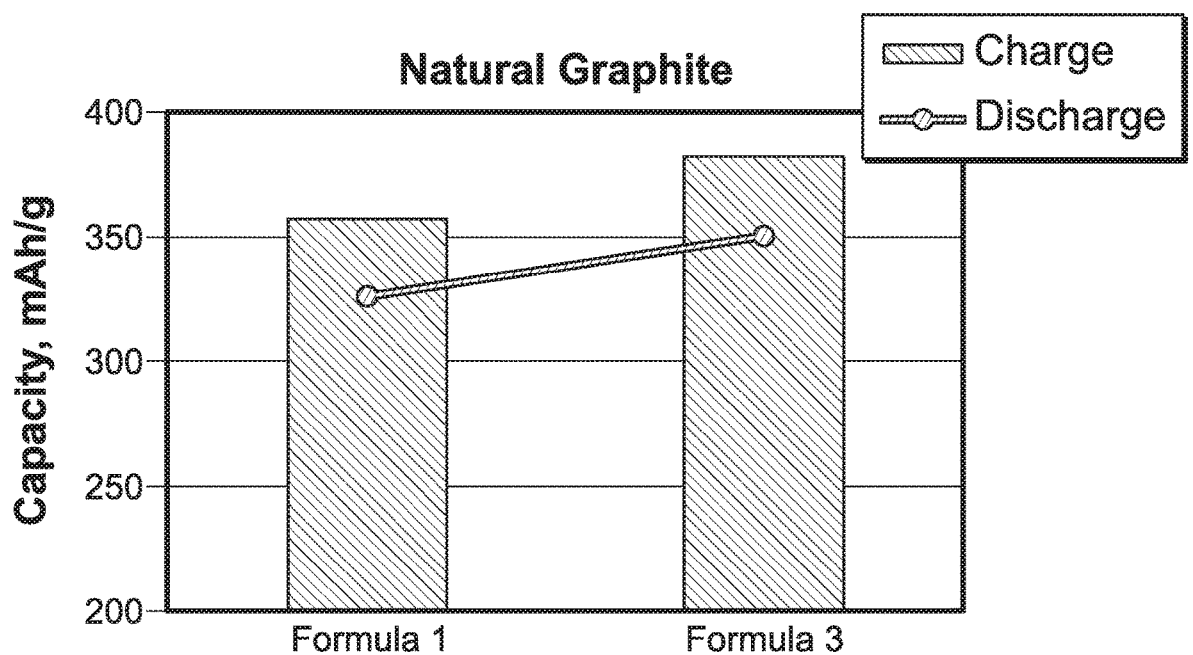
FIGS. 3A and 3B show (3A) charge and discharge capacity and (3B) coulombic efficiency of natural graphite electrode in half cell format according to Example 1.
Figure 3B:
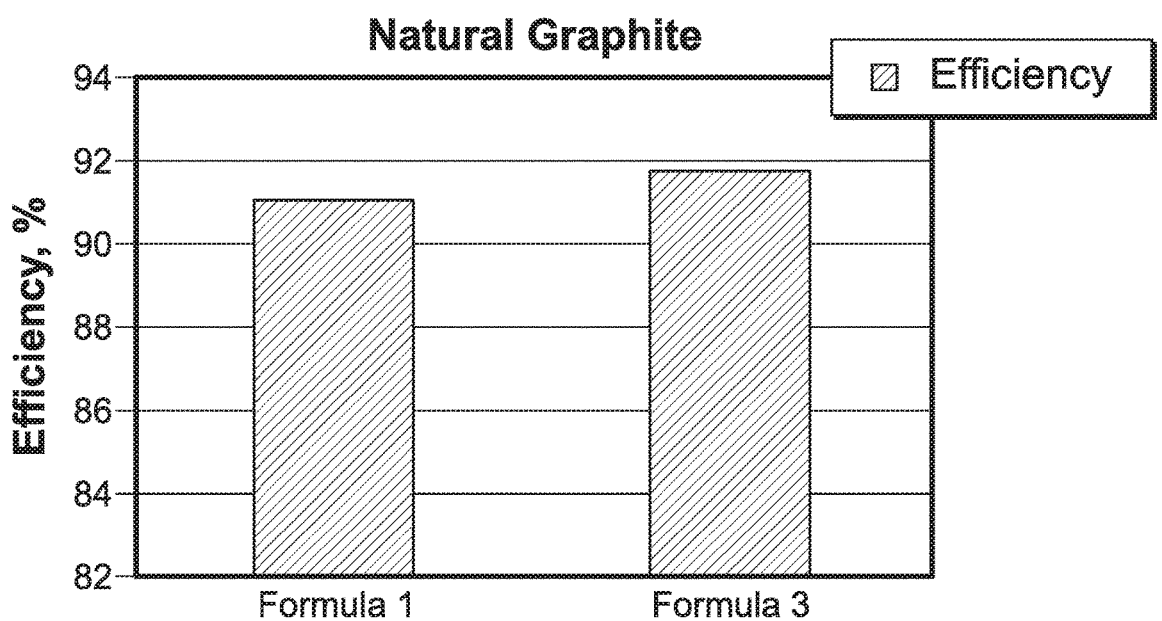

FIG. 3A shows the capacity and FIG. 3B shows the coulombic efficiency of natural graphite-based anode half cells with electrolyte Formulation 1 and Formulation 3. FIGS. 3A and 3B show Formula 1 with a $1^{st}$ charge capacity of about 360 mAh/g, a $1^{st}$ discharge capacity of about 330 mAh/g and an efficiency of about 91%; and Formula 3 with a $1^{st}$ charge capacity of about 380 mAh/g, a $1^{st}$ discharge capacity of about 350 mAh/g and an efficiency of almost 92%. FIGS. 3A and 3B demonstrate that Formula 3 with an EMC-rich binary EC-EMC solution delivers higher reversible capacity and efficiency than that of Formula 1 with an EMC-rich quaternary EC-EMC-DMC-PC solution in natural graphite-based anodes.

Figure 4A:
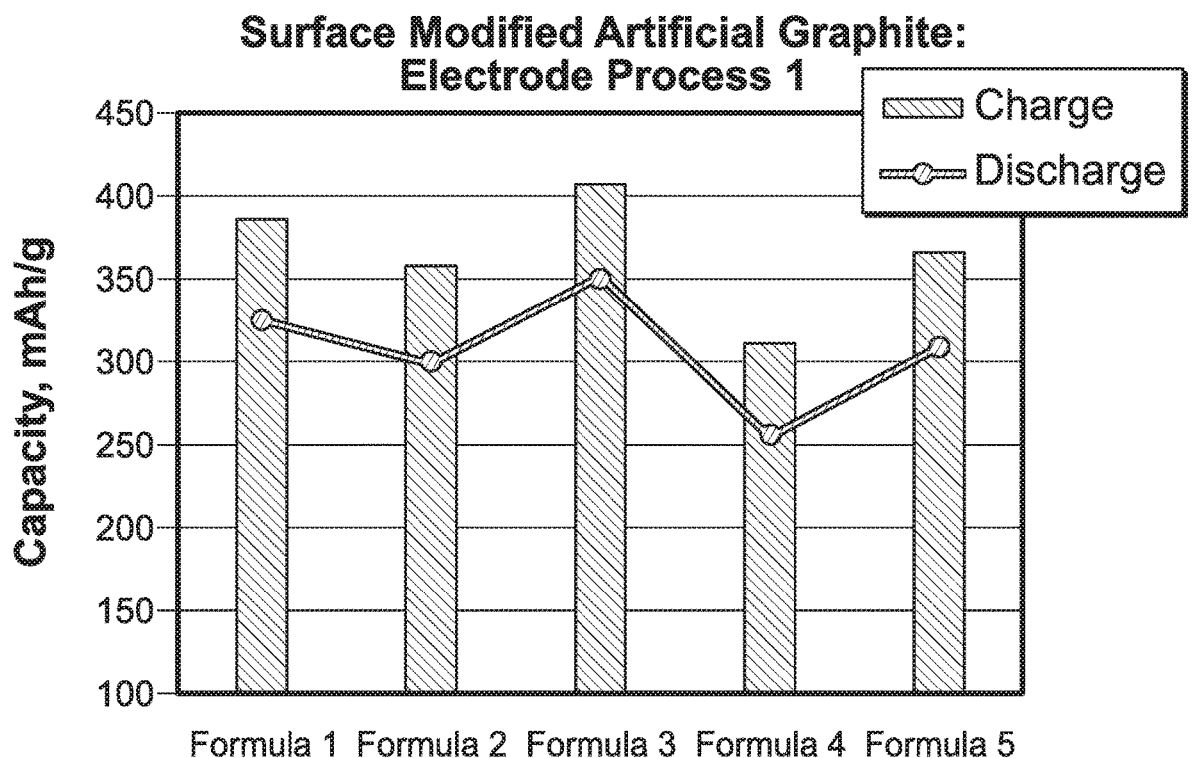
FIGS. 4A and 4B show charge and discharge capacity of artificial graphite electrodes prepared by dry battery electrode (4A) process 1 and (4B) process 2 in half cell configurations according to Example 1.
Figure 4B:
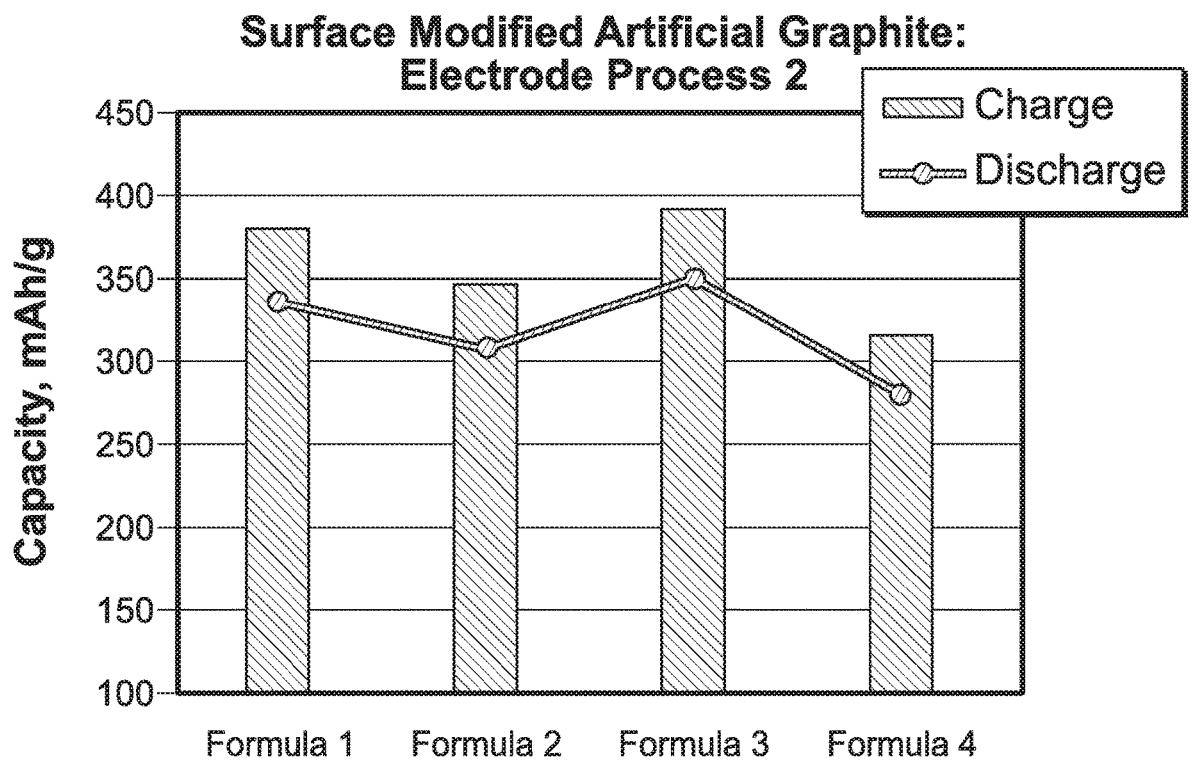

FIGS. 4A and 4B show the charge and discharge capacities of surface modified artificial graphite anode half cells prepared using two different electrode formulations (Process 1 and Process 2) with several electrolyte solvent systems. FIG. 4A shows Formula 1 with a $1^{st}$ charge capacity of about 385 mAh/g and a $1^{st}$ discharge capacity of about 325 mAh/g; Formula 2 with a $1^{st}$ charge capacity of about 310 mAh/g and a $1^{st}$ discharge capacity of about 300 mAh/g; Formula 3 with a $1^{st}$ charge capacity of about 410 mAh/g and a $1^{st}$ discharge capacity of about 350 mAh/g; Formula 4 with a $1^{st}$ charge capacity of about 315 mAh/g and a $1^{st}$ discharge capacity of about 255 mAh/g; and Formula 5 with a $1^{st}$ charge capacity of about 365 mAh/g and a $1^{st}$ discharge capacity of about 315 mAh/g. FIG. 4B shows Formula 1 with a $1^{st}$ charge capacity of about 375 mAh/g and a $1^{st}$ discharge capacity of about 335 mAh/g; Formula 2 with a $1^{st}$ charge capacity of about 305 mAh/g and a $1^{st}$ discharge capacity of about 350 mAh/g; Formula 3 with a $1^{st}$ charge capacity of about 350 mAh/g and a $1^{st}$ discharge capacity of about 395 mAh/g; and Formula 4 with a $1^{st}$ charge capacity of about 315 mAh/g and a $1^{st}$ discharge capacity of about 315 mAh/g. The data indicates that EMC-rich systems, such as Formula 1 and Formula 3, consistently showed improved charge and discharge capacity while maintaining similar coulombic efficiency for electrodes prepared in accordance with Processes 1 and 2. The compositions and specifications of Process 1 and Process 2 are provided in Table 2.

Figure 6A:
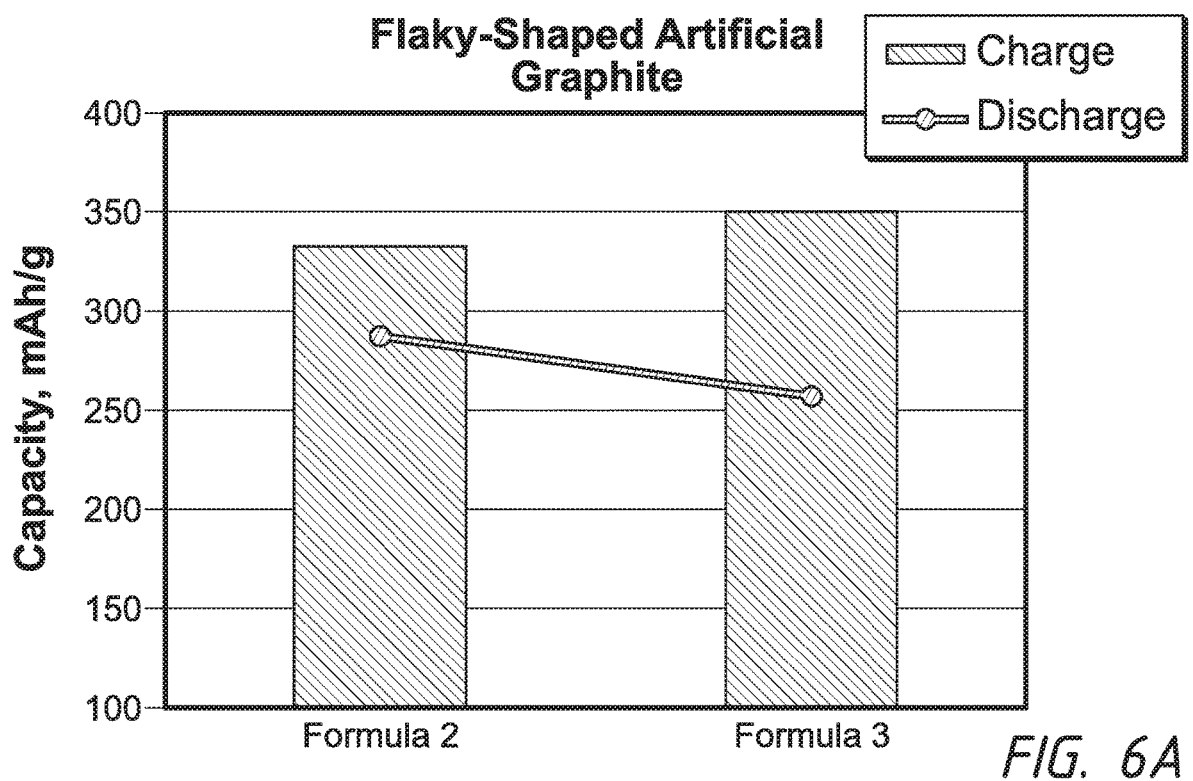
FIGS. 6A and 6B show (6A) charge and discharge capacity and (6B) coulombic efficiency of flake-shaped artificial graphite electrode in half cell format according to Example 1.
Figure 6B:
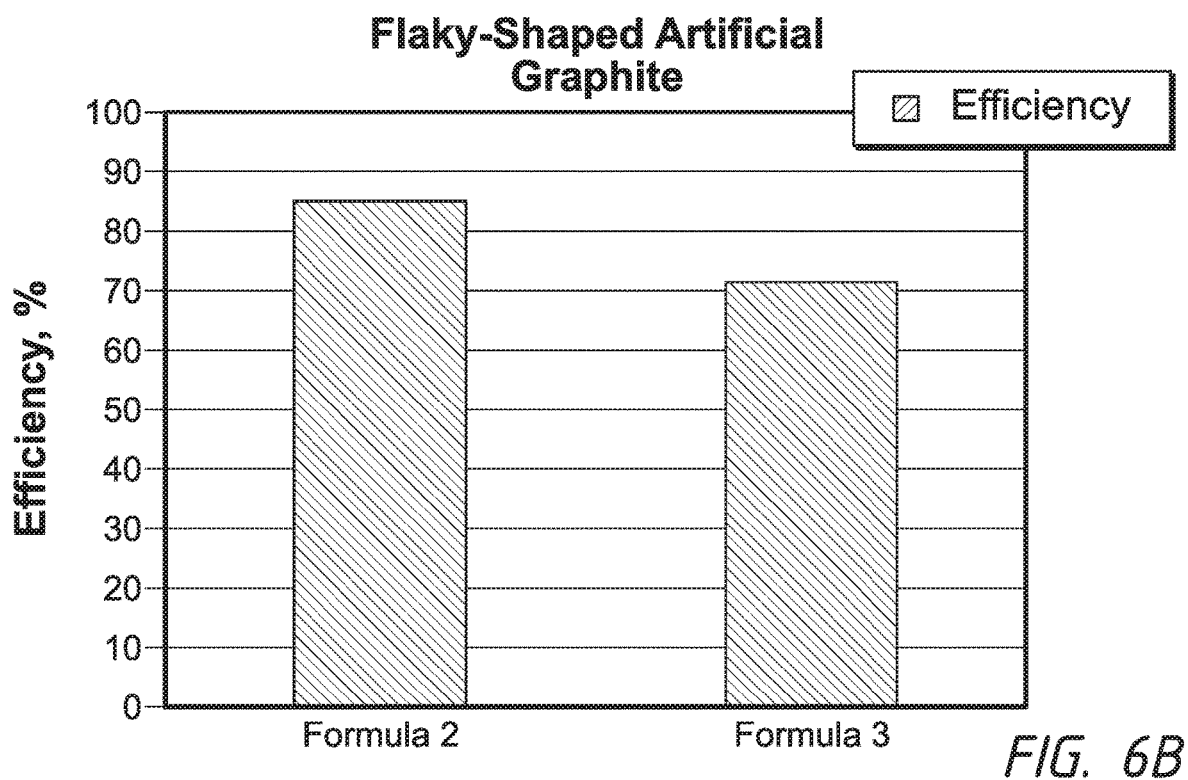

FIG. 6A shows the capacity and FIG. 6B shows the coulombic efficiency of flake-shaped artificial graphite anode half-cells with electrolyte Formulation 2 and Formulation 3. FIGS. 6A and 6B show Formula 2 with a $1^{st}$ charge capacity of about 330 mAh/g, a $1^{st}$ discharge capacity of about 290 mAh/g and an efficiency of about 85%; and Formula 3 with a $1^{st}$ charge capacity of about 350 mAh/g, a $1^{st}$ discharge capacity of about 255 mAh/g and an efficiency of about 70%. FIGS. 6A and 6B demonstrate that while EMC-rich Formula 3 delivered higher charge capacity, the efficiency of Formula 3 is lower than the DMC-rich Formula 2 in flake-shaped artificial graphite anodes. Without being bound to theory, the improved coulombic efficiency of relatively DMC-rich electrolyte systems suggests that DMC may suppress irreversible reactions that occur during the use of flake-shaped artificial dry battery electrodes.

TABLE 2

Process 1 and Process 2 Electrode Film Compositions and Specifications

| Process | Gr | CMC | PTFE | Resodyn Powder Mix | Powder Jet Mill | Dry Film Calender |
|---|---|---|---|---|---|---|
| 1 | 94 wt % | 3 wt % | 3 wt % non-processed | Step 1: Mix Gr/CMC for 5 min at 50% intensity. Step 2: Mix Gr/CMC/PTFE for 5 min at 50% intensity. | Jet mill powder mixture at 40 psi feed and 40 psi grind at feed rate of 4.5 | $1^{st}$ and $2^{nd}$ film calender at 185° C. |
| 2 | 98 wt % | — | 2 wt % pre-jet milled | Mix Gr/PTFE for 10 min at 60% intensity | Jet mill powder mixture at 40 psi feed and 40 psi grind at feed rate of 9 | $1^{st}$ film calender at 100° C. $2^{nd}$ film calender at 150° C. |

Figure 5:
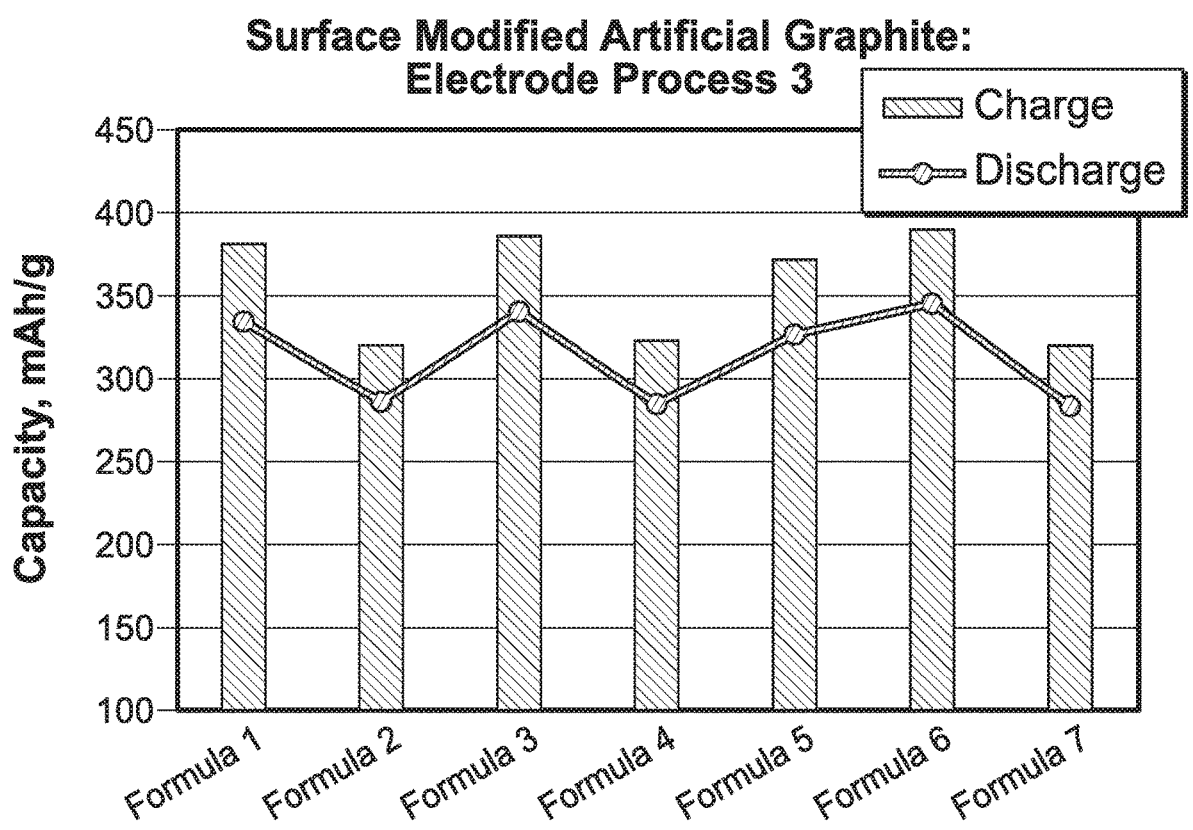
FIG. 5 shows charge and discharge capacity of artificial graphite electrodes prepared according to process 3 in half cell configurations according to Example 1.

FIG. 5 also shows the charge and discharge capacities of surface modified artificial graphite anode half cells prepared using a third electrode formulation (Process 3) with several electrolyte solvent systems. FIG. 5 shows Formula 1 with a $1^{st}$ charge capacity of about 380 mAh/g and a $1^{st}$ discharge capacity of about 335 mAh/g; Formula 2 with a $1^{st}$ charge capacity of about 320 mAh/g and a $1^{st}$ discharge capacity of about 290 mAh/g; Formula 3 with a $1^{st}$ charge capacity of about 385 mAh/g and a $1^{st}$ discharge capacity of about 340 mAh/g; Formula 4 with a $1^{st}$ charge capacity of about 310 mAh/g and a $1^{st}$ discharge capacity of about 240 mAh/g; Formula 5 with a $1^{st}$ charge capacity of about 375 mAh/g and a $1^{st}$ discharge capacity of about 335 mAh/g; Formula 6 with a $1^{st}$ charge capacity of about 390 mAh/g and a $1^{st}$ discharge capacity of about 350 mAh/g; and Formula 7 with a $1^{st}$ charge capacity of about 320 mAh/g and a $1^{st}$ discharge capacity of about 290 mAh/g. The data indicates that the electrolyte solvent systems with relatively EMC-rich formulations, such as Formula 1, Formula 3 and Formula 6, provided higher capacities for anodes comprising surface modified artificial graphite prepared in accordance with Process 3. The composition and specification of Process 3 is provided in Table 3 below.

Figure 7A:
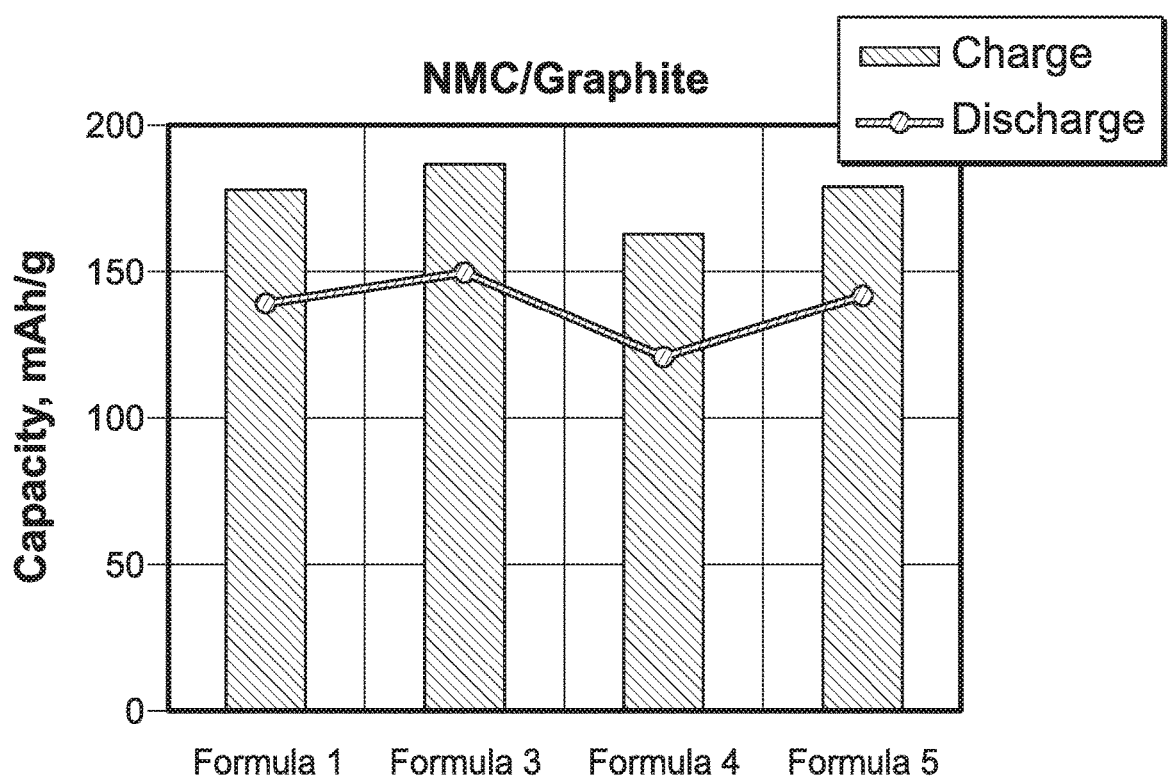
FIGS. 7A and 7B show (7A) charge and discharge capacity and (7B) columbic efficiency of NMC/graphite full cell according to Example 1.
Figure 7B:
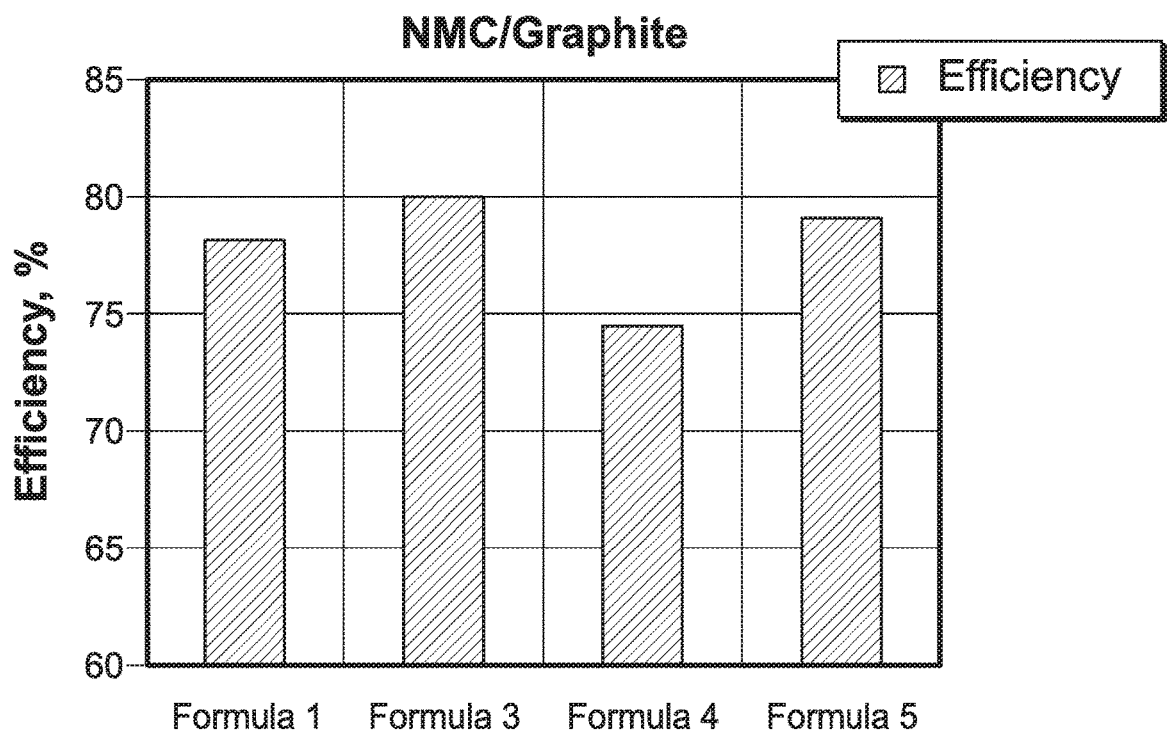

FIG. 7A shows the capacity and FIG. 7B shows the coulombic efficiency of Formulations 1-5 utilized in full-cells comprised of layered lithium nickel manganese cobalt oxide (NMC) as a dry cathode and surface modified artificial graphite as a dry anode. FIGS. 7A and 7B show Formula 1 with a $1^{st}$ charge capacity of about 175 mAh/g, a $1^{st}$ discharge capacity of about 135 mAh/g and an efficiency of about 78%; Formula 3 with a $1^{st}$ charge capacity of about 185 mAh/g, a $1^{st}$ discharge capacity of about 150 mAh/g and an efficiency of about 80%; Formula 4 with a $1^{st}$ charge capacity of about 165 mAh/g, a $1^{st}$ discharge capacity of about 120 mAh/g and an efficiency of about 74%; and Formula 5 with a $1^{st}$ charge capacity of about 175 mAh/g, a $1^{st}$ discharge capacity of about 140 mAh/g and an efficiency of about 79%. FIGS. 7A and 7B demonstrate that Formula 3 with a relatively EMC-rich electrolyte system substantially improves both charge/discharge capacity and coulombic efficiency in NMC/graphite full cells.

TABLE 3

Process 3 Electrode Film Compositions Specifications

| Gr | CMC | PVDF | PTFE | Resodyn Powder Mix | Dry Film Calender |
|---|---|---|---|---|---|
| 96 wt % | 1.5 wt % | 0.5 wt % | 2 wt % pre-jet milled | Step 1: Mix Gr/CMC for 5 min at 60% intensity. Step 2: Mix Gr/CMC/PVDF for 5 min at 60% intensity. Step 3: Mix Gr/CMC/PVDF/PTFE for 5 min at 60% intensity. | $1^{st}$ film calender at 100° C. $2^{nd}$ film calender at 150° C. |

Example 2

In Example 2, electrochemical performances of NMC cathode and surface modified artificial graphite (SMG-A5) anode full cell (NMC/Gr) incorporated with electrolyte Formulation 1 and Formulation 3 were investigated. The specifications of the cathode and anode electrodes, and the electrolytes used in the full cells are provided in Table 4.

Figure 8A:
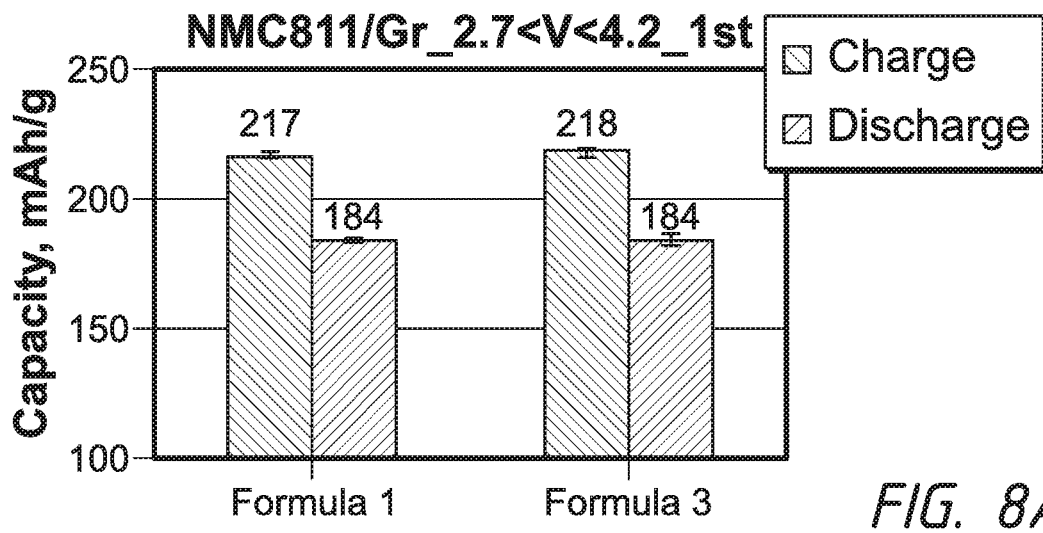
FIGS. 8A-8C show (8A and 8B) charge and discharge capacity as well as (8C) columbic efficiency of NMC811/graphite and NMC622/graphite full cells with electrolytes of formulations 1 and 3 according to Example 2.
Figure 8B:
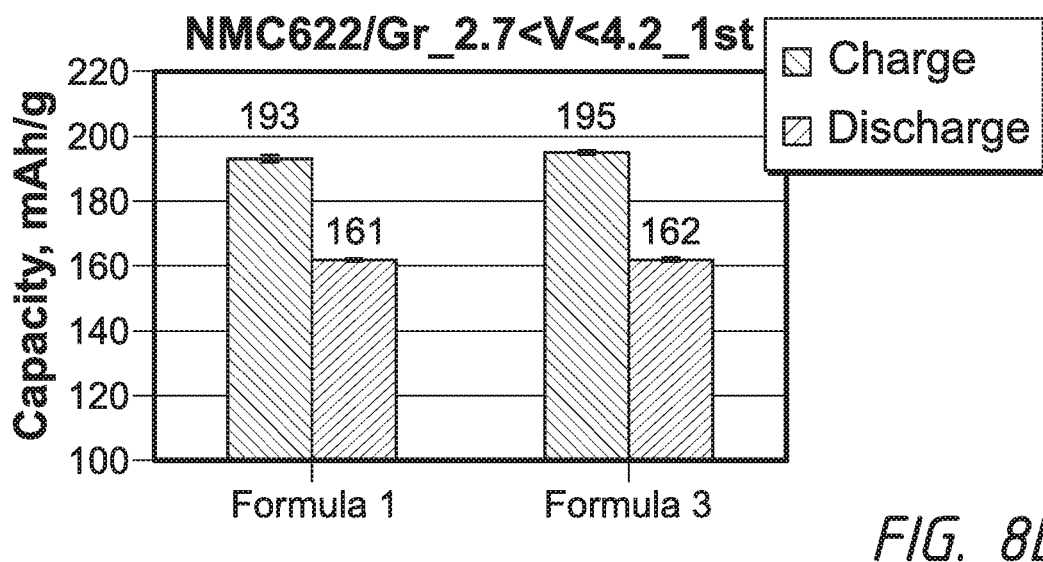
Figure 8C:
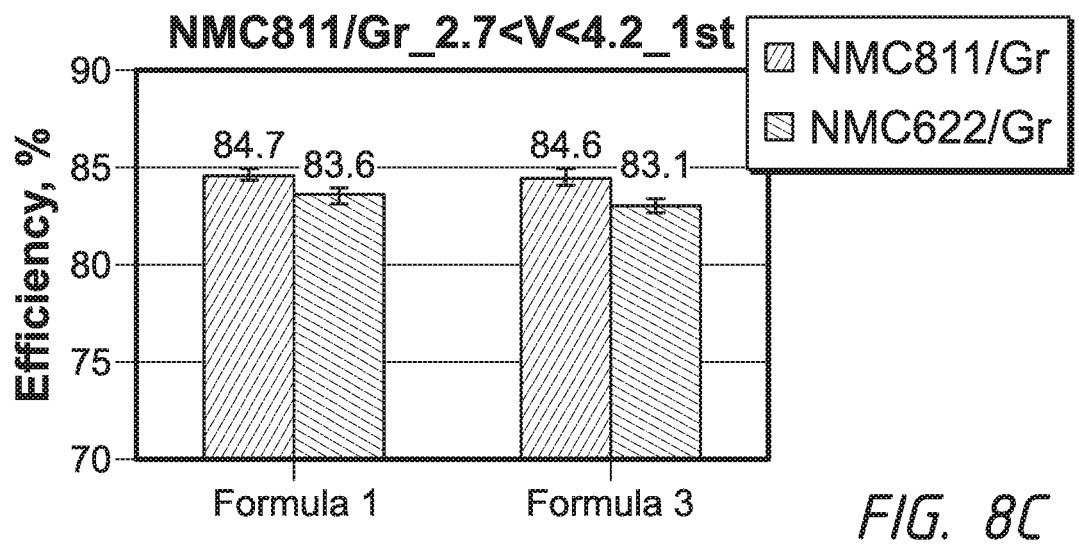

FIG. 8A shows the capacity of NMC811/Gr full cells, FIG. 8B shows the capacity of NMC622/Gr full cells, and FIG. 8C shows the efficiencies of NMC811/Gr and NMC622/Gr full cells filled with electrolytes of Formulation 1 and Formulation 3, wherein the $1^{st}$ cycle capacities and efficiencies of the cells were calculated based on the cells being cycled at a 0.05 C rate and a cut-off voltage of 4.2V for charge and 2.7V for discharge. FIGS. 8A and 8C show a NMC811/Gr full cell with an electrolyte of Formulation 1 having a $1^{st}$ charge capacity of about 217 mAh/g, a $1^{st}$ discharge capacity of about 184 mAh/g and an efficiency of about 84.7%; and with an electrolyte of Formulation 3 having a $1^{st}$ charge capacity of about 218 mAh/g, a $1^{st}$ discharge capacity of about 184 mAh/g and an efficiency of about 84.6%. FIGS. 8B and 8C show a NMC8622/Gr full cell with an electrolyte of Formulation 1 having a $1^{st}$ charge capacity of about 193 mAh/g, a $1^{st}$ discharge capacity of about 161 mAh/g and an efficiency of about 83.6%; and with an electrolyte of Formulation 3 having a $1^{st}$ charge capacity of about 195 mAh/g, a $1^{st}$ discharge capacity of about 162 mAh/g and an efficiency of about 83.1%. FIGS. 8A-8C demonstrate that Formulations 1 and 3 show similar $1^{st}$ cycle capacities and efficiencies for both NMC611/Gr and NMC811/Gr full cells.

TABLE 4

Electrode and Electrolyte Specifications

| Electrolyte | Cathode | Loading | Anode | Loading |
|---|---|---|---|---|
| Formula 1 | NMC811 | 40 mg/cm2 | Gr | 23.5 mg/cm2 |
| Formula 3 | NMC811 | 39.9 mg/cm2 | Gr | 23.6 mg/cm2 |
| Formula 1 | NMC622 | 39.5 mg/cm2 | Gr | 20.5 mg/cm2 |
| Formula 3 | NMC622 | 39.9 mg/cm2 | Gr | 20.7 mg/cm2 |

After condition cycles and the $1^{st}$ formation cycles shown in FIGS. 8A-8C, the performance of NMC811/Gr full cell with electrolyte Formulation 1 and Formulation 3 were evaluated. The full-cells were rate cycled at 0.33 C with at voltage window of 4.2V and 2.7V for charge and discharge, respectively. It was found that Formula 1 electrolyte cells showed improved capacity retention after 500 cycles compared with Formula 3 electrolyte cells, where the capacity retention for was about 88.5% for full-cells with electrolyte Formula 1 and 84.7% for full-cells with electrolyte Formula 3.

Figure 9A:
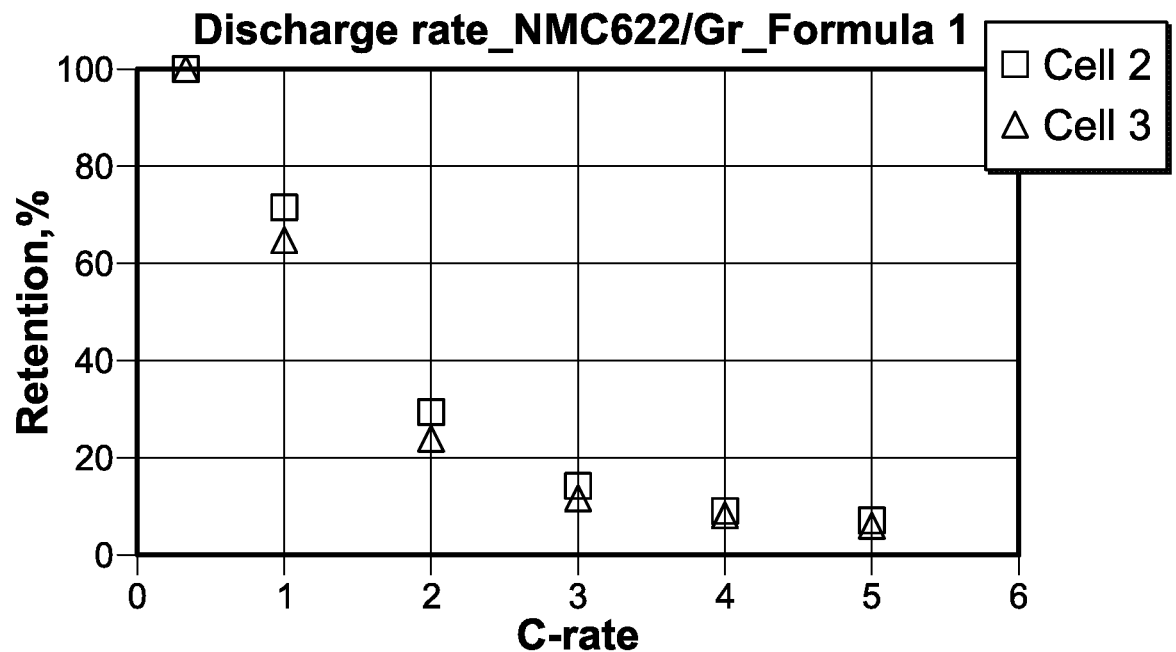
FIGS. 9A and 9B show (9A) discharge and (9B) charge capacity retentions for NMC622/graphite full cells with an electrolyte of Formulation 1 according to Example 2.
Figure 9B:
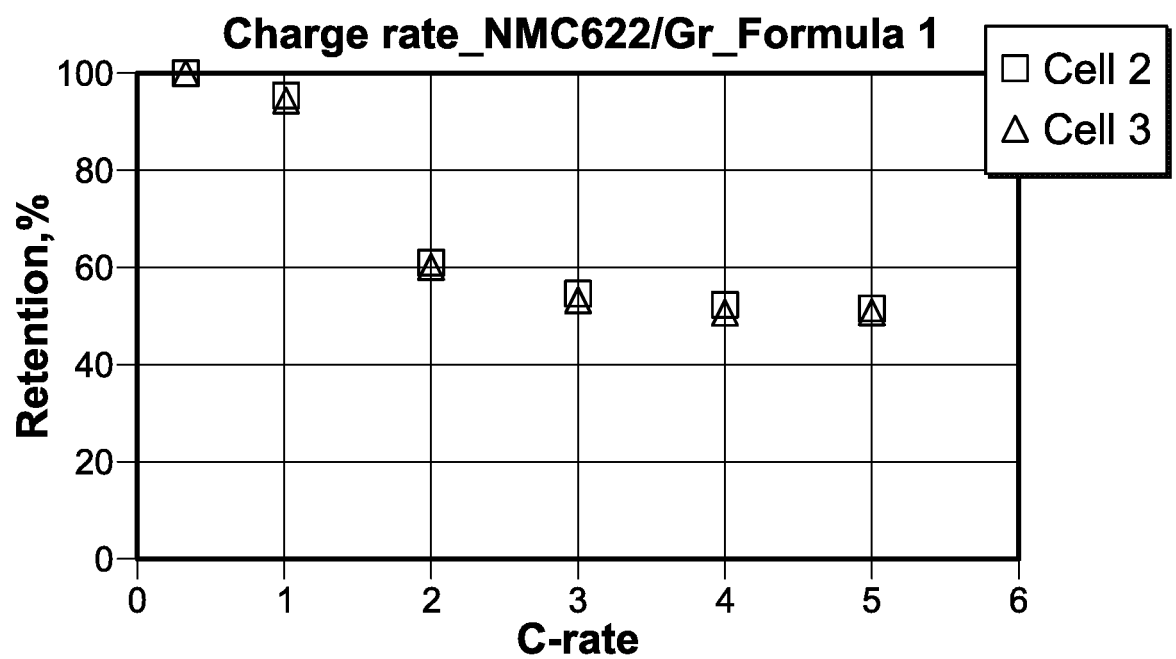

FIG. 9A shows the discharge capacity retention and FIG. 9B shows the charge capacity retention NMC622/Gr full cells with electrolyte Formulation 1 after condition cycles a $1^{st}$ formation cycle. The FIGS. 9A and 9B charge capacity retentions are provided in Table 5.

TABLE 5

Average Charge Capacity Retentions at Varying Rates for NMC622/Gr Full Cells with Formula 1 Electrolyte

| Rate | 1C | 2C | 3C | 4C | 5C |
|---|---|---|---|---|---|
| Charge | 94.2% | 60.3% | 53.5% | 51.3% | 50.6% |

Figure 10A:
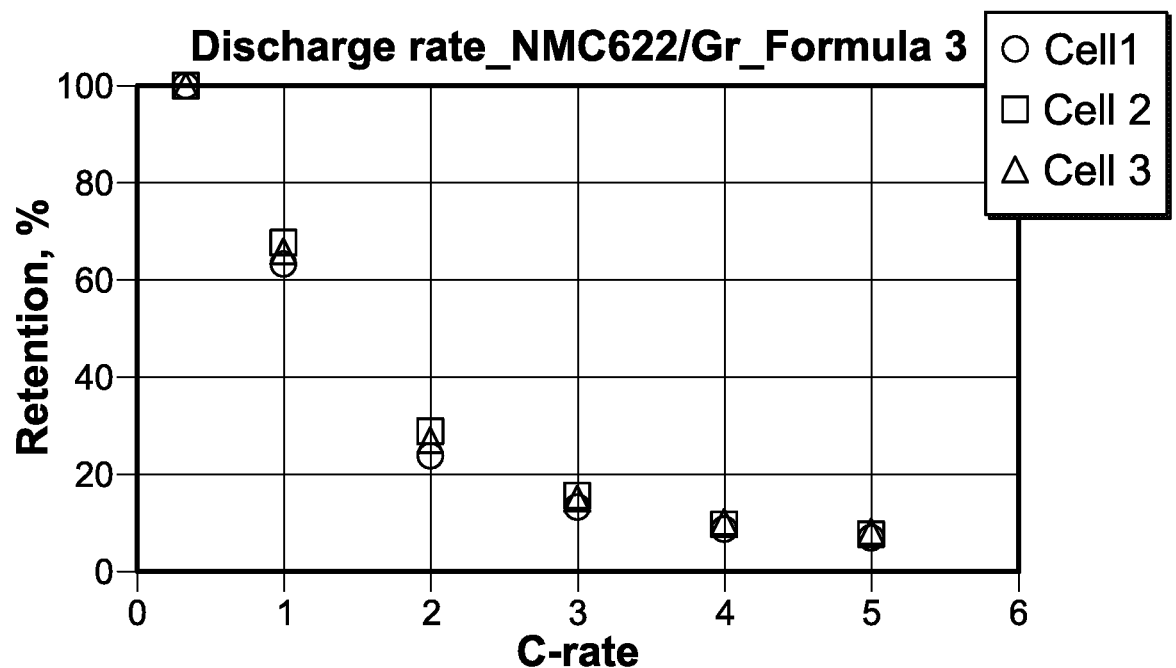
FIGS. 10A and 10B show (10A) discharge and (10B) charge capacity retentions for NMC622/graphite full cells with an electrolyte of Formulation 3 according to Example 2.
Figure 10B:
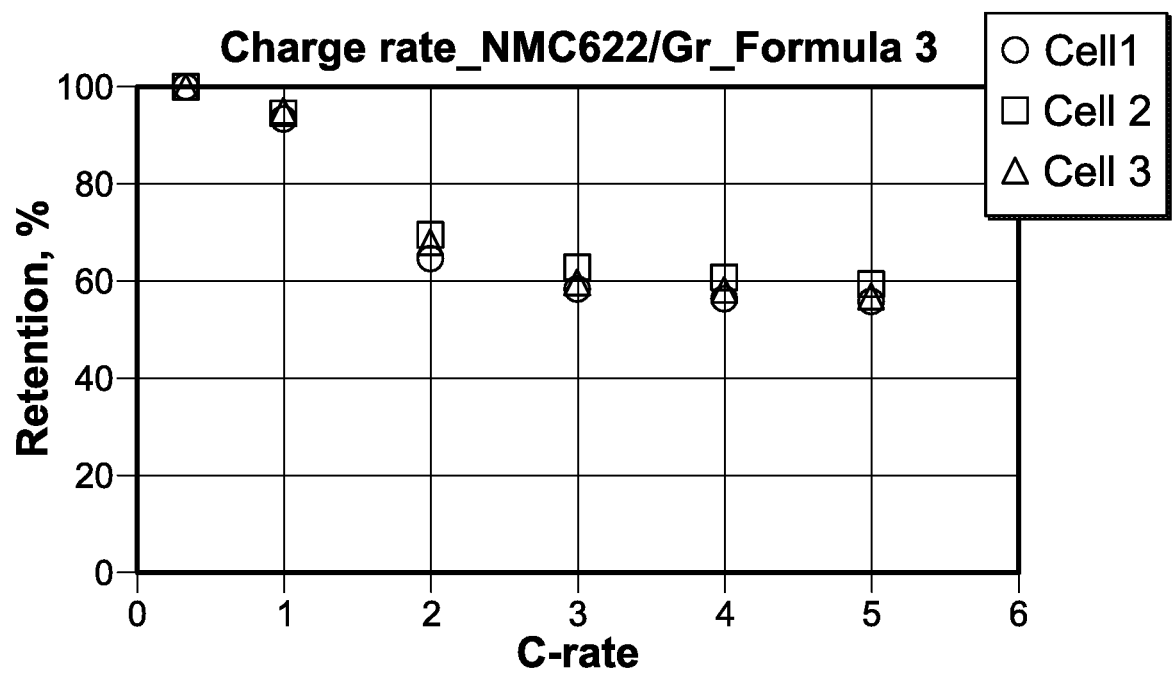

FIG. 10A shows the discharge capacity retention and FIG. 10B shows the charge capacity retention NMC622/Gr full cells with electrolyte Formulation 3 after condition cycles a $1^{st}$ formation cycle. The FIGS. 10A and 10B charge capacity retentions are provided in Table 6.

TABLE 6

Average Charge Capacity Retentions at Varying Rates for NMC622/Gr Full Cells with Formula 3 Electrolyte

| Rate | 1C | 2C | 3C | 4C | 5C |
|---|---|---|---|---|---|
| Charge | 94.5% | 68.1% | 60.8% | 58.7% | 57.6% |

FIGS. 9A-10B and Tables 5 and 6 demonstrate that electrolyte Formulations 1 and 3 in NMC622/Gr full cells show similar behaviors of charge and discharge capacity retention as a function of varying C-rates, where retentions decrease with increased C-rate, and that Formula 3 showed improved charge capacity retention over Formula 1 at C-rates above 1 C.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An energy storage device, comprising:
a cathode comprising a cathode active material;
an anode comprising an anode active material and a binder, wherein the anode active material comprises surface modified artificial graphite, wherein the surface modified artificial graphite is surface modified with amorphous carbon, wherein the binder comprises a fibrillized binder, and wherein at least one of the cathode and the anode are free from solvent residue;
a separator between the cathode and the anode; and
an electrolyte comprising a lithium salt and a non-aqueous electrolyte solvent formulation comprising ethylene carbonate (EC) and ethyl methyl carbonate (EMC), wherein the volume ratio of EC to EMC is about 1:2.4 to about 1:4;
wherein the energy storage device has a capacity retention after 500 cycles of at least about 80%.

2. The energy storage device of claim 1, wherein the non-aqueous electrolyte solvent further comprises dimethylcarbonate (DMC), and comprises EC/DMC in a volume ratio of 1:3.

3. The energy storage device of claim 1, wherein the non-aqueous electrolyte solvent comprises EC/EMC in a volume ratio of 1:2.4.

4. The energy storage device of claim 1, wherein the non-aqueous electrolyte solvent comprises EC/EMC in a volume ratio of 1:4.

5. The energy storage device of claim 1, wherein the non-aqueous electrolyte solvent further comprises dimethylcarbonate (DMC), and comprises EC/DMC in a volume ratio of 1:4.

6. The energy storage device of claim 1, wherein the anode active material further comprises natural graphite.

7. The energy storage device of claim 1, wherein the anode active material further comprises flake-shaped artificial graphite.

8. The energy storage device of claim 1, wherein the cathode active material comprises layered lithium nickel manganese cobalt oxide (NMC).

9. The energy storage device of claim 1, wherein the cathode active material comprises sulfur or a material including sulfur.

10. The energy storage device of claim 1, wherein the lithium salt is $LiPF_6$.

11. The energy storage device of claim 1, wherein the energy storage device has a first charge capacity of at least about 150 mAh/g.

12. The energy storage device of claim 1, wherein the energy storage device has a first discharge capacity of at least about 100 mAh/g.

13. The energy storage device of claim 1, wherein the energy storage device has an efficiency of at least about 70%.

14. The energy storage device of claim 1, wherein the energy storage device has a charge capacity retention at 1C of at least about 94%.

15. The energy storage device of claim 1, wherein the energy storage device has a discharge capacity retention at 1C of at least about 65%.

16. A method of forming an energy storage device of claim 1, comprising:
    providing a housing,
    placing into the housing the cathode, the anode and the separator between the cathode and the anode; and
    placing into the housing the electrolyte to form the energy storage device.

17. The energy storage device of claim 1, wherein the non-aqueous electrolyte solvent consists essentially of EC and EMC.

18. The energy storage device of claim 1, the cathode comprises a fibrillized binder.

19. The energy storage device of claim 1, wherein the fibrillized binder comprises PTFE.

20. The energy storage device of claim 1, wherein at least one of the anode active material and the cathode active material comprise spherical-shaped particles.

21. The energy storage device of claim 1, wherein the volume ratio of EC to EMC is about 1:3 to about 1:4.

22. The energy storage device of claim 1, wherein the binder further comprises an additional binder.

23. The energy storage device of claim 22, wherein the additional binder is selected from a carboxymethylcellulose (CMC), polyvinylidene fluoride (PVDF), co-polymers thereof, and combinations thereof.

24. The energy storage device of claim 23, wherein the binder consists essentially of the fibrillizable binder and the additional binder.

25. The energy storage device of claim 1, wherein the binder consists essentially of the fibrillizable binder.

* * * * *